United States Patent
Lowery (10) Patent No.: US 6,543,390 B2
(45) Date of Patent: Apr. 8, 2003

(54) ANIMAL VEHICLE HARNESS (76) Inventor: Lisa Lowery, 30055 San Martinez Rd., Val Verde, CA (US) 91384

( * ) Notice: Subject to any disclaimer, the term of this patent is extended or adjusted under 35 U.S.C. 154(b) by 0 days.

(21) Appl. No.: 09/825,146

(22) Filed: Apr. 3, 2001

(65) Prior Publication Data

US 2002/0139319 A1 Oct. 3, 2002

(51) Int. Cl.7 ............................................. A01K 27/00
(52) U.S. Cl. ........................ 119/771; 119/792; 119/856
(58) Field of Search .................................. 119/771, 769, 119/770, 786, 787, 788, 790, 791, 792, 793, 868, 818

(56) References Cited

U.S. PATENT DOCUMENTS

| 3,792,687 A | * | 2/1974 | Ehrman | 119/868 |
| 3,994,264 A | * | 11/1976 | Flynt | 119/815 |
| 4,969,419 A | * | 11/1990 | Fong | 119/868 |
| 4,970,991 A | * | 11/1990 | Luce | 119/771 |
| 5,305,710 A | * | 4/1994 | Ward, Jr. | 119/756 |
| 5,443,037 A | * | 8/1995 | Saleme | 119/771 |
| 5,529,018 A | * | 6/1996 | Butts | 119/792 |
| 5,845,606 A | * | 12/1998 | Hartman | 119/856 |
| 6,164,245 A | * | 12/2000 | Johnson | 119/712 |
| 6,253,713 B1 | * | 7/2001 | Giedeman et al. | 119/771 |

* cited by examiner

Primary Examiner—Yvonne Abbott
(74) Attorney, Agent, or Firm—Cherskov & Flaynik (57) ABSTRACT An attachment to a typical commercial animal chest harness comprises a rear harness defining two leg loops adapted to receive the animal's hind legs, a strap or other such flexible attachment for connecting the rear harness to a first fixed point, a strap for joining the rear harness to the chest harness, and another strap or other such flexible attachment connecting the chest harness to a second fixed point.

19 Claims, 6 Drawing Sheets

ANIMAL VEHICLE HARNESS

BACKGROUND OF THE INVENTION

1. Field of the Invention

The present invention relates to the field of animal harnesses and more specifically to animal harnesses restraining animal motion during vehicular travel.

2. Description of the Prior Art

Animals, especially dogs, are often transported in such vehicles as cars, vans, and trucks. For the animal's safety, it is necessary, and in some jurisdictions required, that the animal be properly restrained. Several animal harnesses, especially canine harnesses, have been introduced for that purpose.

For instance, U.S. Pat. No. 6,101,979 to Wilson et al. discloses a six-strap vehicular harness for dogs and cats. Three of these straps secure a form fitted pad to the chest (called the brisket) of the animal. A fourth strap passes across the animal's upper back (or withers) and around a vehicle's seatbelt to communicate with the chest pad straps. One strap extends upwardly across each shoulder of the animal.

U.S. Pat. No. 5,529,018 to Buffs discloses another six-strap vehicular harness mounted on the animal's upper withers. Four of the straps, running along the animal's upper front region (called the stifle) of its rear legs, are designed to be secured to the vehicle's seat belt. This configuration relegates the animal to a sifting position.

U.S. Pat. No. 4,907,541 to Thompson discloses a harness around the animal's neck and chest that may be secured to the same fastener as that to which a passenger's seat belt is secured.

U.S. Pat. No. 5,427,061 to McCullough discloses another vehicular harness mounted on the animal's upper back and neck and attached to the seat belt.

U.S. Pat. No. 5,167,203 to Scott et al. discloses an animal chest harness that may be removably attached to a back frame that in turn can be attached to a seat belt.

The above harnesses all have several disadvantages. First, they all relegate the animal to a sifting position on a car seat. Second, they wrap only around the animal's neck and upper body. As such, the hind portion of the animal, particularly the lower lumbar area (called the loin) and the hip, remain unsecured.

Third, typical vehicular harnesses tie the animal to a seat belt at only one point. No accommodation is made for when the animal is riding on the floor of a van or truck.

Also, typical vehicular harnesses prove very awkward for securing large animals. By securing only the animal's upper, forward body region, which is much higher than its center of gravity, these harnesses lack adequate restraint when a sideways or centrifugal force acts on the animal. Furthermore, prior art designs tend to secure animals in a much too confining a manner, not affording adequate opportunity for leg movement.

Lastly, the prior art harnesses are not designed as walker harnesses. As such, in order to use vehicular harnesses, the animal caretaker must either completely remove the animal's walking harness (thereby increasing the chance for the momentarily "freed" animal to escape), or else wrap the vehicular harness around (or on top of) the walking harness.

There is a need in the art for a vehicular harness that may be used in conjunction with the animal's walking harness. The vehicular harness should be usable with the animal tied to a flat low friction surface, such as the floor of a van or a truck, while also providing adequate restraint against sideways centrifugal or other forces by securing both the animal's front and hind portions. The harness should provide the animal with some freedom to move its legs.

SUMMARY OF THE INVENTION

It is an object of the present invention to provide an animal harness that overcomes many of the disadvantages of the prior art.

It is a further object of the present invention to provide an animal vehicular harness that may be used in conjunction with commercially available animal walking harnesses. It is a feature of the present invention that it comprises a rear harness adapted to be removably attached to a standard walking harness. It is an advantage of the present invention that the animal owner need not purchase a complete separate harness in order to restrain the animal when it is riding in a vehicle. Another advantage is that use of the invented harness in conjunction with a walking harness facilitates full-time confinement of the animal.

It is another object of the present invention to provide an animal vehicular harness that may be used to secure a live four-legged animal to a low friction surface, such as the floor of a vehicle or a truck. A feature of the present invention is a plurality of means reversibly attaching the animal to one or two fixed points. An advantage of the present invention is that the animal caretaker may attach the animal to fixed points inside a vehicle as well as to the seat belts on the vehicle.

It is still a further object of the present invention to provide an animal vehicular harness that may be used in conjunction with animals of various sizes. It is a feature of the present invention that it comprises a full complement of components that may be adjusted to match the animal's structure. It is an advantage of the present invention that the animal caretaker need not purchase a separate harness for different sized animals.

It is yet a further object of the present invention to provide an animal vehicular harness that allows adequate freedom of motion to the animal. It is a feature of the present invention that it secures the animal at two fixed points. It is an advantage of the present invention that the animal caretaker need not bind the animal very tightly in order to provide the animal with adequate safety against sideways centrifugal or other forces.

It is yet another object of the present invention to provide an animal vehicular harness that secures the hind portion of the animal. It is a feature of the present invention that it comprises two hind-leg loops. It is an advantage of the present invention that the animal's hind quarters are secured independently of the front quarters. Another advantage is that the harness enables the animal to either stand, sit or lie down. As such, the invented harness does not relegate the animal to a single, sentry-type position.

BRIEF DESCRIPTION OF THE DRAWING

The invention together with the above and other objects, features and advantages will best be understood from the following detailed description of the preferred embodiment of the invention shown in the accompanying drawing, wherein.

DETAILED DESCRIPTION OF THE INVENTION

The present invention provides a vehicular harness to be used in conjunction with the animal's walking harness. The invented harness is usable when the animal is fastened to a seat-belt or to the floor of a van or a truck. The invented harness provides adequate restraint against sideways centrifugal or other forces by securing and elastically restraining both the animal's front and hind portions, while also providing the animal with some freedom to move its legs.

Specifically, the present invention provides an attachment to a typical commercial animal chest harness. The invention comprises a rear harness defining two leg loops adapted to receive the animal's hind legs, a strap or other such means for connecting the rear harness to a first fixed point which is remote from the animal and harness, a strap for joining the rear harness to the chest harness, and another strap or other such means connecting the chest harness to a second fixed point which is remote from the animal and harness.

Figure 1:
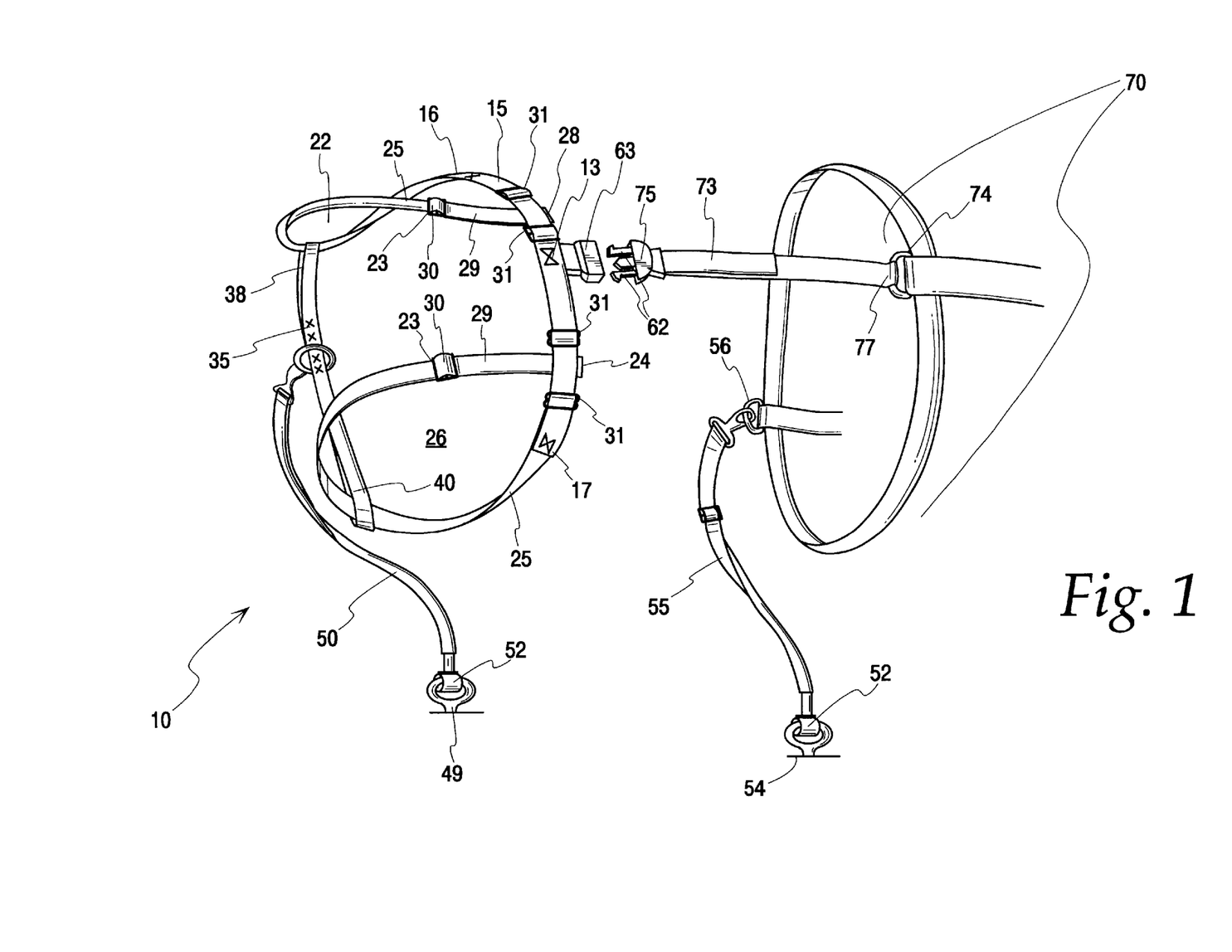
FIG. 1 is a perspective view of a first embodiment of a rear harness used in conjunction with a front harness design in accordance with the present invention.

The invented rear harness is depicted as numeral 10 in FIG. 1. It is schematically depicted in conjunction with a typical commercially available walking harness, 70.

The rear harness 10 comprises an arcuate-shaped, elongated substrate 15, having a mid-point 13 which is intermediate a first end 16 and a second end 17 the substrate. The arcuate shape is adapted to be complementary to the curvature of the loins of the animal as the substrate 15 extends transversely from one loin to the other. (See also FIG. 3 for an enlarged view.)

The first end 16 and second end 17 of the elongated substrate each terminates with downwardly, and rearwardly extending straps 25 formed into loops 22, 26. The ends 23 of the straps communicate with points 27 on the elongated substrate which are situated laterally from the mid-point 13 of the substrate. As more fully illustrated in FIG. 3, this communication can be slidable communication wherein the end 23 of each of the straps contact a point on their respective strap distal from the lateral points 27 of the substrate, so forming a belt loop 29. The ends 23 of the strap 25 have affixed thereto a buckle 30 through which slack in the strap 25 can be adjusted. Aside from buckles, other means for adjusting the slack in the strap are suitable, including, but not limited to, hook-and-pile configurations (e.g. Velcro®), or snap fit configurations.

Means for preventing the belt loop 29 from drifting too far along the longitudinal axis of the substrate 15 are provided, including stitching at the ends 16, 17 of the substrate, or buckles 31 situated intermediate the ends 16, 17 and the midpoint 13 of the substrate.

The leg loops 22, 26 are adapted to receive the animal's hind legs, so as to be juxtaposed with the hips. As can be noted in FIG. 2a, neither the stifle (front leg portion), S, nor hock (rear upper leg portion), H, of the animal are contacted with the loops 22, 26.

The leg loops 22 and 26 are connected to each other by a connector strap 35 juxtaposed intermediate the leg loops. The connector strap 35 extends transversely relative to the animal, and defines loops 38 and 40 at each of its ends. The loops 38, 40 are adapted to slidably communicate with that portion of the rearwardly extending straps 25 forming the hind leg loops 22 and 26.

Figure 3:
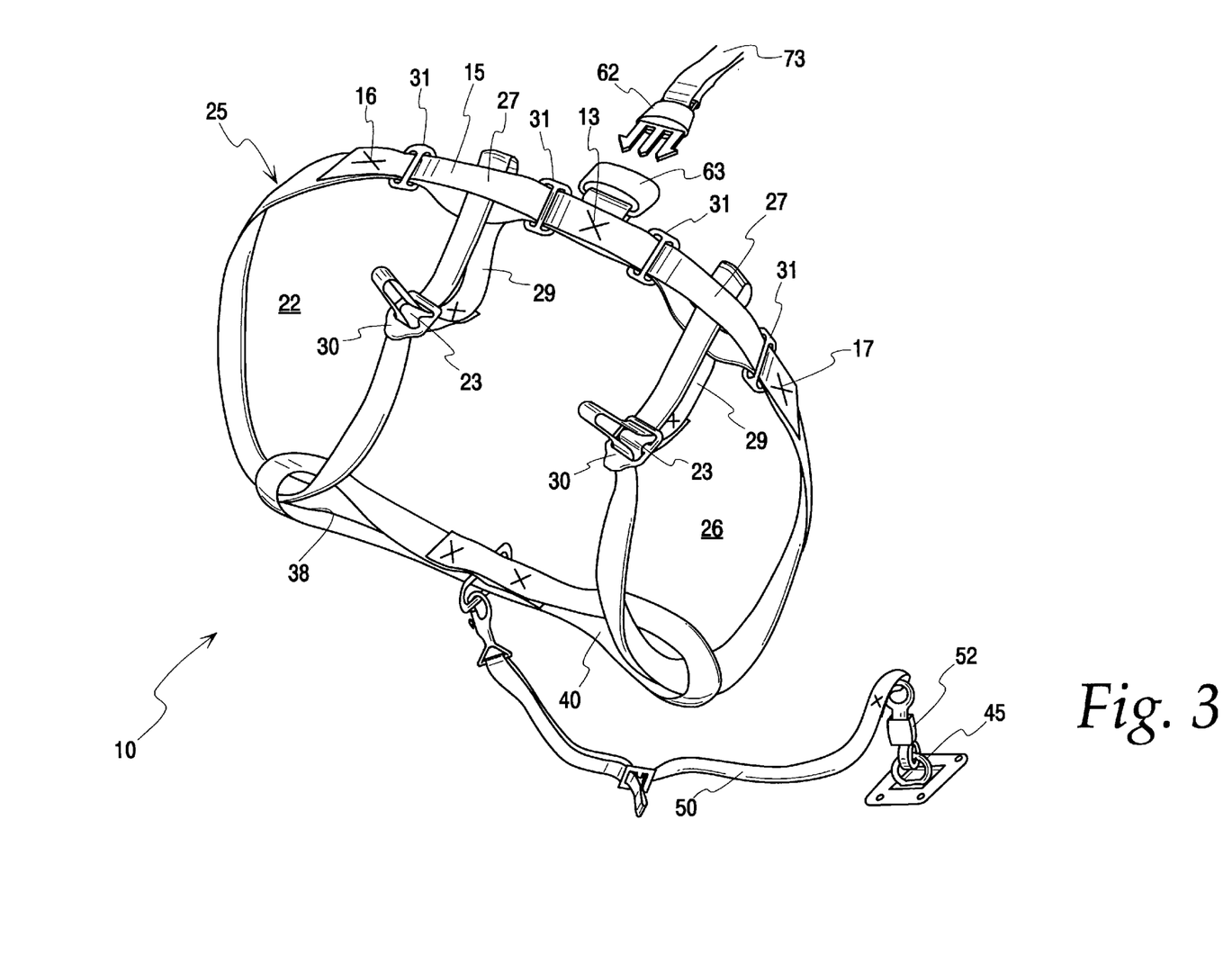
FIG. 3 is an enlarged perspective view of the invented rear harness, in accordance with features of the present invention.

The rear harness 15 is adapted to detachably join to any commercially available front harness 70 by means of a suspender strap 73 or other elongated substrate. The suspender strap 73 is terminated at a first end 75 with a means for fastening to the invented rear harness and at a second end 77 to the front walker harness. Walker harnesses 70 all accommodate the attachment of a leash, this accommodation typically embodied by a ring, 74. As such, the second end of the suspender strap may be attached to a clip-on buckle which in turn may be clipped onto the ring 74. The first end 75 of the suspender strap 73 attaches to the elongated substrate 15 by any reversibly attachable means, such as hook-and-pile, snap fit, threaded rod-aperture configurations, simple ties, and ball-detent configurations. An exemplary snap-fit attachment configuration is shown in FIGS. 1 and 3, and consists of outwardly biased projections 62 adapted to mate with an aperture in a male-female configuration. Specifically, FIG. 1 shows a male prong 62 that is adapted to be received by the latch's female prong 63, the later attached at the midpoint 13 of the elongated substrate 15.

Animal Securing Detail

The invention accommodates securing the animal to a single point, or to a plurality of fixed points. As such, in one instance, the invention allows the animal to be secured from the front harness 70 only, while the front harness is mated with the rear harness 10. In another instance, the invention allows the animal to be secured from the rear harness 15 only. Lastly, the invention allows the animal to be secured from the rear harness and front harness simultaneously.

In instances where both the front harness 70 and rear harness 10 are simultaneously secured to remote attachment points, the invention provides that the attachment points can be remote from each other, or the same point. For example, in one instance, depicted in FIG. 2a, each harness is attached to the same point. This prevents entanglement of the animal as the animal moves 180 degrees.

FIG. 1 depicts two remote attachment points, remote both from the harnesses and each other. Specifically, the invented complementary harness 10 facilitates securing the animal to the two fixed points 49 and 54 by means of a plurality of tethers. FIG. 1 depicts a first tether 50 and a second tether 55. The first tether 50 is removably attached to the rear harness 15 by means of a ring 51 that may slide along the longitudinal axis of the connector strap 35. The second tether 55 is connected to the front harness in a typical fashion (e.g. via a ring 56 if one is so provided by the front harness 70). If a ring 56 is not provided by the front harness 70 or if a ring 51 is not provided by the rear harness 10, then carabineers or quick-links, all commercially available, can be substituted for said rings 56 or 51.

The ends of the first and second tethers 50, 55 are adapted to removably attach to the remote locations 49 and 54 by such means as clip-on buckles 52, carabineers, or quick-links, all commercially available. The fixed points 49 and 54 can be eye-bolts or rings to which the clip-on buckles may be attached. Especially convenient remote attachment points are recessed flip-up rings mounted on the floor of a truck, van, or car as shown in FIG. 3.

Optionally, the tethers 50 and 55 are adjustable in length.

When the same fixed point is utilized to anchor all of the tethers, best results are obtained when the clip-on buckles 52 are pivotable vis-a-vis the fixed point.

Fabrication and Usage Details

As outlined above, usage of the invented harness attachment is straight-forward. It can be used in conjunction with any commercially available chest harness 70 adapted to receive a leash.

A chest harness that is equipped at the back of the animal's neck with a ring 74 or some other such device to which a walking leash may be attached and with another ring 56 along the front or on the belly of the animal to which a clip-on buckle 52 may be attached is especially suitable. Yet a myriad of other chest harnesses may be used in conjunction with the invented rear harness.

Operation Detail

Figures 2A, 2B:
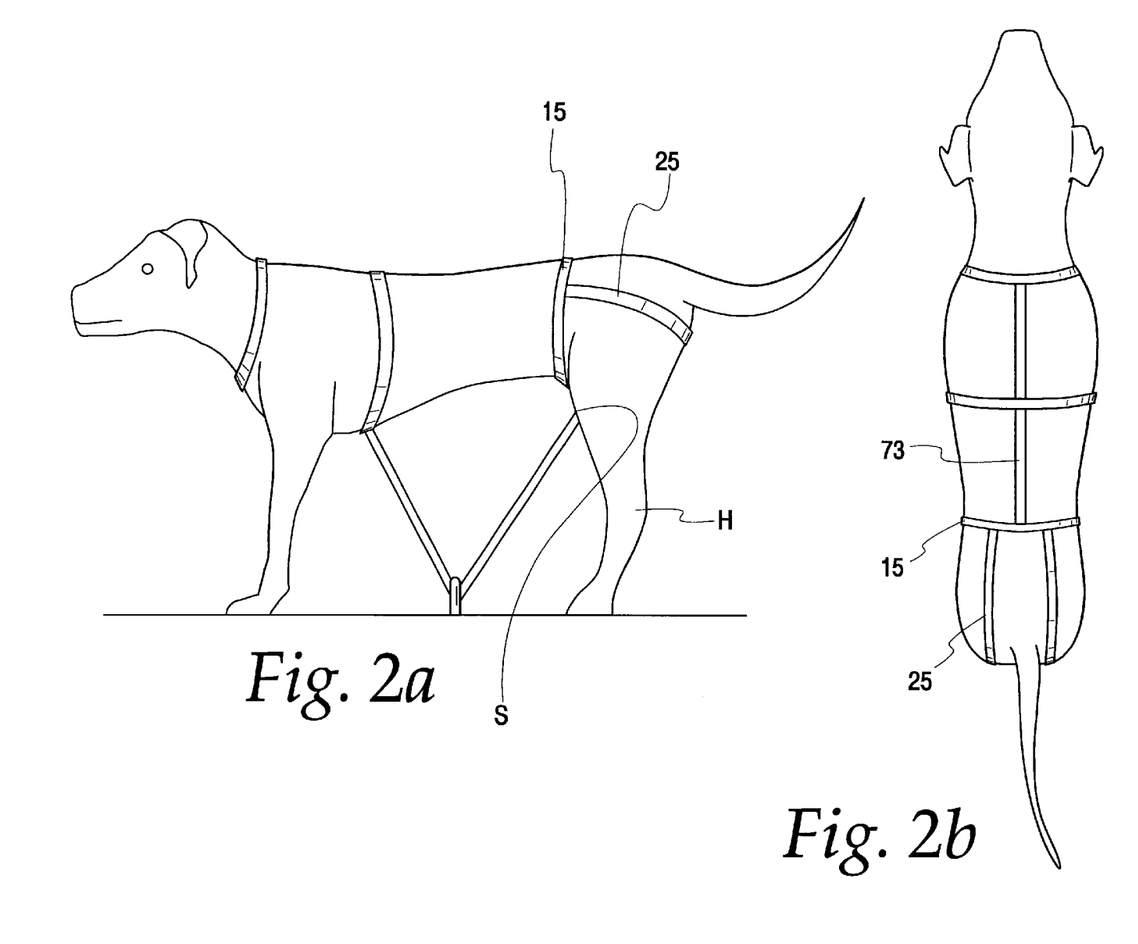
FIGS. 2a, 2b, and 2c are side, aerial, and rear views respectively of a dog equipped with the invented harness used in conjunction with a front harness design, in accordance with features of the present invention.
Figure 2C:
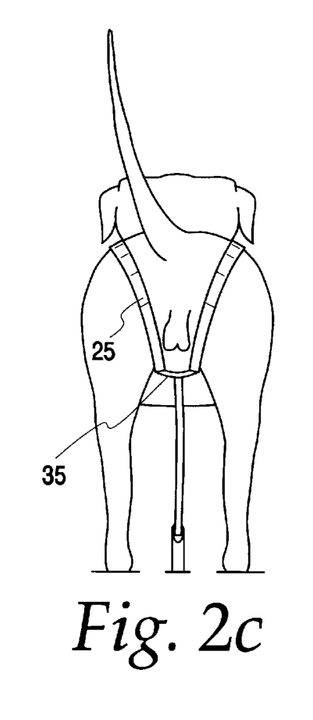

FIGS. 2a, 2b, and 2c are side, aerial, and rear views of a dog equipped with the invented rear harness used in conjunction with a typical front harness. The invented harness attachment is placed on the animal in a few very easy steps. First the suspender strap 73 is threaded or otherwise attached to the front harness 70, perhaps via the leash ring 74. Then the animal's hind legs are inserted in their respective leg loops 22 and 26 of the invented harness 10 with the buckles 30 and 31 and tightened appropriately, perhaps with buckles 30, 31, or by adjusting the fastening means facilitating communication of the straps 25 to the elongated substrate 15, discussed supra. Finally, the suspender strap is attached to the front harness, (perhaps with the male latch prong 62 snapped into the female prong 63) and the suspender strap is tightened.

No limitation exists on the type of materials used in fabricating the several straps comprising the invented harness. Suitable materials include, but are not limited to, leather, cloth such as linen, cotton, nylon webbing or canvas, synthetic materials such as nylon. These materials, particularly the nylon webbing or canvas, can be reversibly deformable material so as to impart an elastic quality thereto.

The tethers 50 and 55 that are used to tie the animal to the fixed points may be fabricated using the materials just listed or they may be made of metal chain of the type used in fabricating leashes. In fact the animal's leash may be used as a tether. A myriad of means may be employed where straps are to be joined to each other. Depending on the material used for the straps and on the weight of the animal to be harnessed, sewing, riveting, heat welding, etc . . . may be used. The various rings, latches, or buckles may be made of a myriad of materials including, but not limited to, metal, plastic, nylon or wood.

Figure 4:
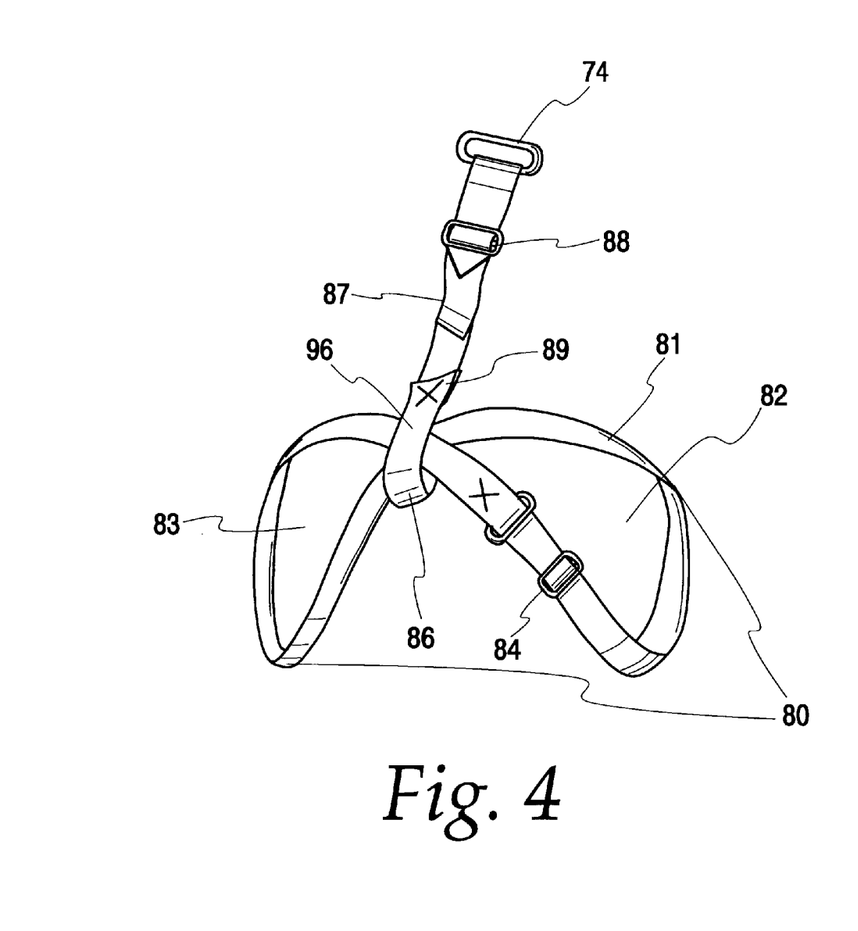
FIG. 4 is a perspective view of an alternative embodiment of a rear harness in accordance with features of the present invention.

The present invention of a rear harness removably attached to a pre-existing front harness may be modified in many ways. FIG. 4 depicts one such modification where a strap 81 with its two ends joined by an adjustable buckle. The strap 81 is configured into a figure eight harness 80, defining two loops 82, 83. Each of the loops receives one of the hind legs of an animal. This figure eight configuration is joined to the leash ring 74 of the typical front harness 70 via an elongated substrate, such as a spine strap 87. The strap 87, reminiscent of the suspender strap 73 described supra, is situated intermediate the figure eight harness. The spine strap 87 terminates at a first end with a means for attaching to the leash ring 74, said means described supra. A second end 89 of the spine strap 87 defines a loop, through which the figure-eight harness 80 slides. The figure-eight harness 80 comes to rest within the loop 86 at the intersection point 96 of loops defined by the figure-eight harness. That rest point can remain fluid, or else can be secured via a snap-fit arrangement (not shown) between the intersection point 96 of the figure-eight harness and an interior surface of the loop.

Figure 7:
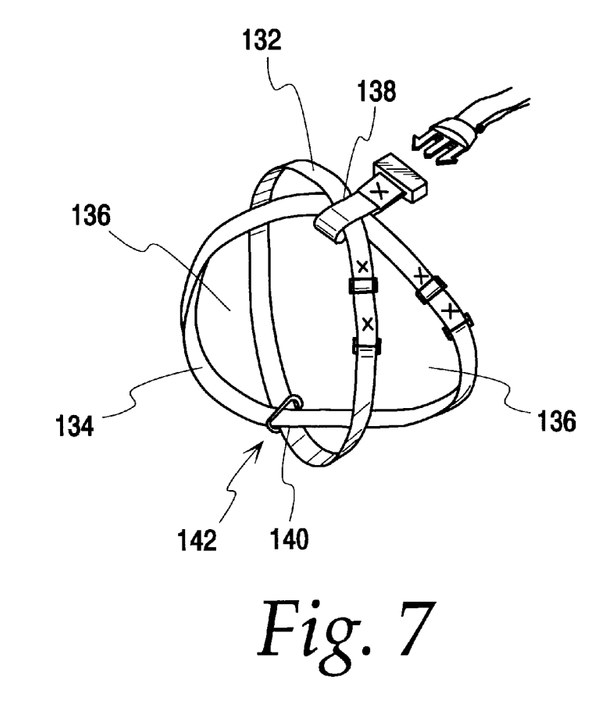
FIG. 7 is a perspective view of a hing-leg securing device for use in conjunction with a front harness, in accordance with features of the present invention.

Yet another configuration embodying the invented hind-leg securing device is depicted in FIG. 7 as numeral 130. The front-harness attachment mechanism for this device 130 is similar those previously discussed. This device 130 contains the hind leg loops, also discussed, supra. In this instance, the loops are defined by a first circular strap 132 concentrically aligned with a second circular strap 134, wherein the first strap is circumferentially askew or non-aligned with the circumferential periphery of the second strap. The nonalignment facilitates the formation of passageways 136 through which the hind legs of an animal protrude.

The non-aligned arrangement of the first circular strap vis-a-vis the second circular strap results in the straps contacting each other at two opposing points of their peripheries. The opposing points of each strap form a line through the center of each of the centers of the circular straps. For example, a first point 138 of strap 132 directly opposes a second point 140 of the first strap 132. The first opposing points of the two straps are maintained in juxtaposition and contact with each other via a simple substrate formed as a ring 142 or loop.

Figure 5A:
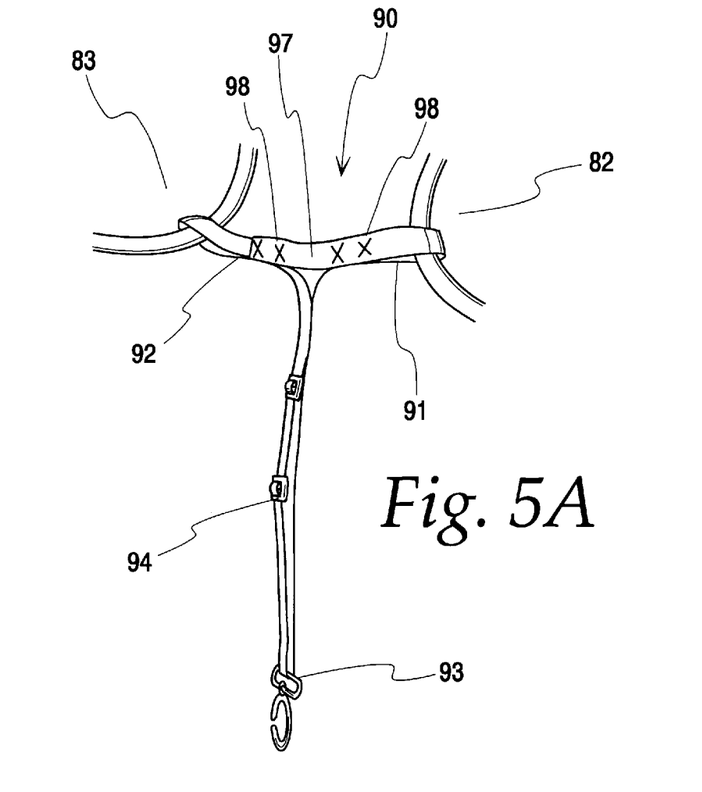
FIGS. 5a and 5b depict alternative tethers in accordance with features of the present invention.
Figure 5B:
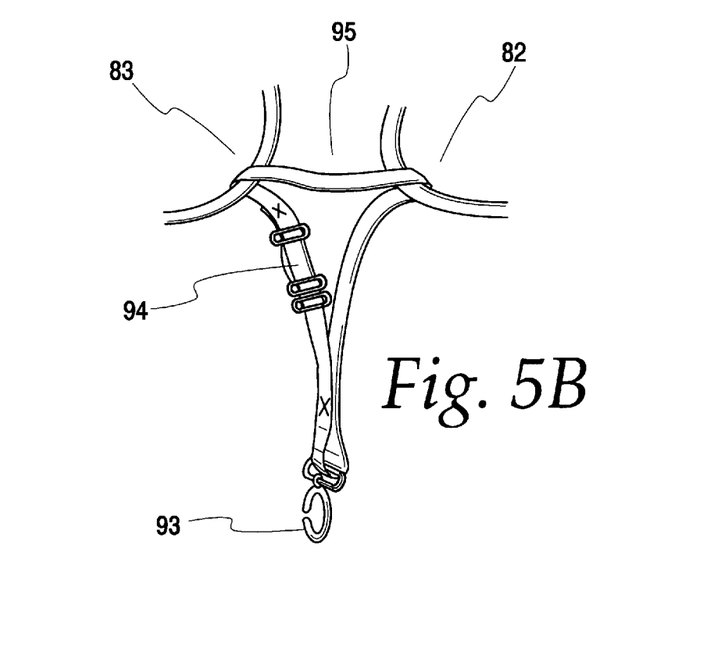

FIGS. 5a and 5b depict tethers that may be attached to a rear harness and at the same time function as a connector strap between the two leg loops. FIG. 5a depicts a tether 90 that is formed by folding a strap 97 once over itself, longitudinally. Stitching 98, or some other fastening means is utilized to permanently form loops 91 and 92 at a first end of the folded strap 97 tether, so that the loops extend laterally from the longitudinal axis formed by the folded strap and generally extend in opposite directions. The tether is attached to the rear harness by threading the leg loops 82, 83 (or 22, 26) through the loops 91 and 92. A clip-on buckle 94 is slidably attached to the strap and the strap's two ends. The straps two ends extend in the direction of a remote fixed point or points, such as point 54 depicted in FIG. 1.

FIG. 5b depicts yet another tether formed by a single strap that is threaded through the two leg loops 82, 83 (or 22, 26) and the buckle 93. The strap's ends are tied by the adjustable buckle 94 .

The Fixed Points to Which the Animal is Tied

The present invention is designed for use with a large variety of fixed points. The two remote fixed points 49 and 54 to which the animal is tied may be any two convenient points an arbitrary distance apart. It can be easily appreciated that the two fixed points may be reduced to one single point, and, also, that the fixed points may be points that are above the animal, perhaps on a bar across the vehicle or fixtures on the vehicle's inside roof such as a coat hanger hook. Finally, the present invention may be used with appropriate fixed points indoors or outdoors totally outside the vehicular context.

As noted above, the two fixed points may be reduced to one. (See FIG. 2.) Yet it is a distinct advantage that both the front and the hind portions of the animal be tied. If only one end is tied, the animal may gyrate around the fixed point, either voluntarily, or under the impact of a sideways centrifugal or other acceleration. With both portions of the animal being tied, this is much less likely. Yet the present invention allows considerable freedom of motion to the animal's limbs.

Figure 6:
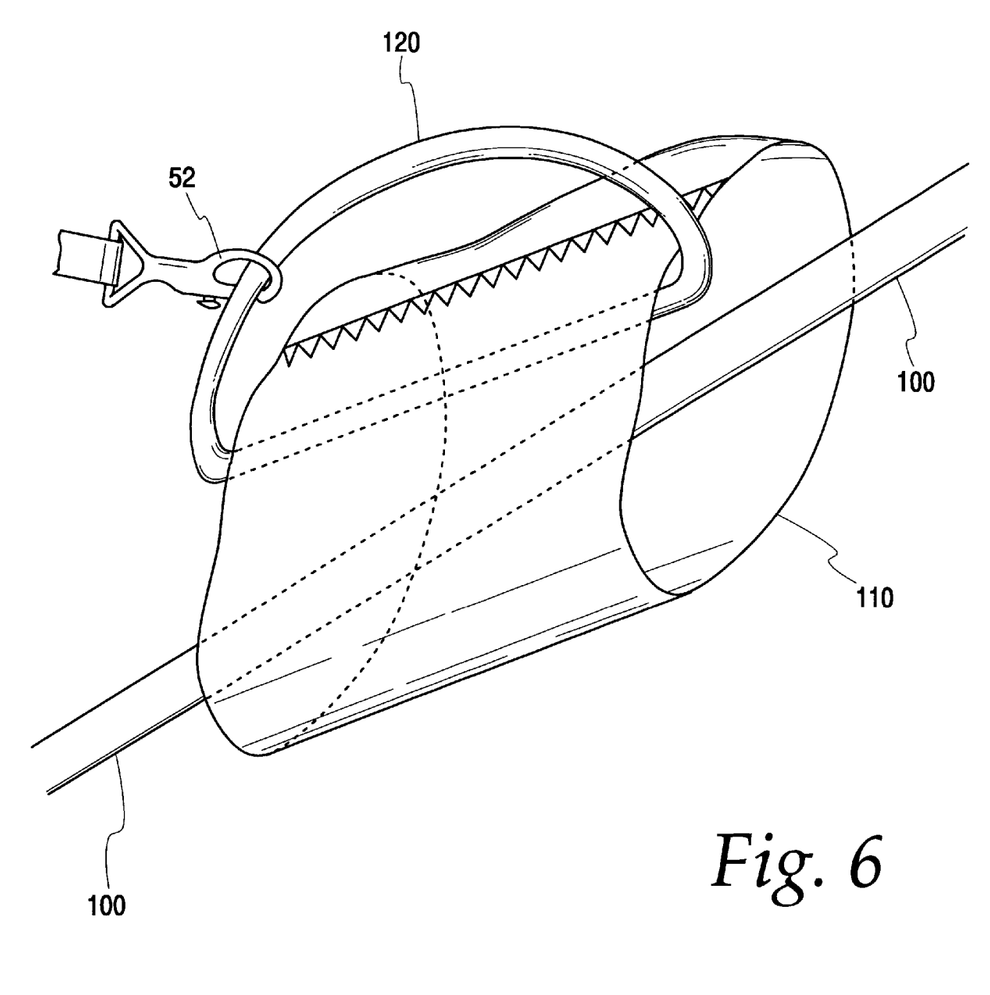
FIG. 6 is a perspective view of a cuff allowing attachment of a rear harness to a vehicular seat belt in accordance with features of the present invention.

The buckles 52 terminating the joining members 50 and 55 may be chosen to clip onto a variety of fixed point attachments 49 and 54. There are several means commercially available to tie the buckles 52 to a vehicular seat belt. The simplest is having the seat belt pass through a metal ring and have the buckles clip on to the ring. Another option is depicted in FIG. 6 where the seat belt 100 is threaded through a cylindrical cuff 110 that in turns is encompassed by a D-shaped ring 120. The buckle 52 is clipped on the ring 120.

While the invention has been described in the foregoing with reference to details of the illustrated embodiment, these details are to be considered as illustrative only and are not intended to limit the scope of the invention as defined in the appended claims. Since numerous modifications and changes will readily occur to those skilled in the art, it is not desired to limit the invention to the exact construction and operation shown and described, and, accordingly, all suitable modifications and equivalents fall within the scope of this invention as limited only by the scope of the appended claims.

The embodiments of the invention in which an exclusive property or privilege is claimed are defined as follows:

1. An attachment to an animal chest harness, the attachment comprising:
    a) a substrate constituting a rear harness defining two leg loops adapted to receive an animal's hind legs;
    b) a means extending transversely relative to the animal for connecting said leg loops;
    c) a means for removably attaching said rear harness to the chest harness; and
    d) a means for attaching said rear harness to a fixed point removed from the animal.

2. The harness attachment as recited in claim 1 wherein the chest harness is a canine chest harness.

3. The harness attachment as recited in claim 1 where the joining means is adjustable in length.

4. The harness attachment as recited in claim 1 wherein the leg loops are adjustable in diameter.

5. The harness attachment as recited in claim 1 wherein the fixed point is inside a vehicle.

6. The harness attachment as recited in claim 1 wherein the attaching means is pivotably attached to the fixed point.

7. The harness attachment as recited in claim 1 wherein the animal has a spine and the joining means extends along the animal's spine.

8. The harness attachment as recited in claim 1 wherein the fixed point further comprises more than one remotely spaced point.

9. The harness attachment as recited in claim 1 wherein said attaching means directly communicates with the chest harness.

10. The attachment as recited in claim 1 wherein the means for connecting said leg loops extends underneath the animal.

11. An attachment to an animal chest harness, the attachment comprising:
    a) a rear harness comprising two leg loops adapted to receive an animal's hind legs;
    b) a means, extending transversely relative to the animal, for connecting said leg loops;
    c) a first tether for attaching the connecting means to a first fixed point removed from the animal;
    d) a means for joining said rear harness to the chest harness; and
    e) a second tether for attaching the chest harness to a second fixed point removed from the animal.

12. The attachment as recited in claim 11 wherein the joining means extends along the spine of the animal.

13. The attachment as recited in claim 11 wherein the first fixed point and second fixed point are inside an automobile.

14. The attachment as recited in claim 11 wherein the first tether slidably communicates with the connector means.

15. The attachment as recited in claim 11 wherein the means for connecting said leg loops is positioned underneath the animal.

16. An attachment to an animal chest harness, the attachment comprising:
    a) a rear harness defining two leg loops adapted to receive an animal's hind legs;
    b) a means for connecting said leg loops;
    c) a first tether for attaching the connecting means to a first fixed point;
    d) a means for joining said rear harness to the chest harness; and
    e) a second tether for attaching the chest harness to a second fixed point wherein the first fixed point and the second fixed point are the same point.

17. The attachment as recited in claim 16 wherein the first tether and the second tether are pivotally attached to the same point.

18. An attachment to a chest harness worn by an animal, the attachment comprising:
    a) a rear harness comprising two leg loops joined across the animal's spine and adapted to receive the animal's hind legs;
    b) a means for connecting said leg loops transversely across a lower portion of the animal's abdomen;
    c) a first tether for attaching the connecting means to a first fixed point remote from the animal;
    d) a means for joining said rear harness to the chest harness along the spine of the animal; and
    e) a second tether for attaching the chest harness to a second fixed point remote from the animal.

19. The attachment as recited in claim 18 wherein the attachment is adapted to attach to the chest harness while the chest harness is worn by the animal.

* * * * *